United States Patent [19]

Chiba et al.

[11] Patent Number: 4,522,994

[45] Date of Patent: Jun. 11, 1985

[54] POLYPROPYLENE RESIN FOR HIGH-RIGIDITY MOLDED PRODUCTS

[75] Inventors: Hiromasa Chiba, Chibaken; Katsumi Kumahara, Ichiharashi; Takakiyo Harada, Ichiharashi; Takahiro Oka, Ichiharashi; Akihiro Sato, Ichiharashi, all of Japan

[73] Assignee: Chisso Corporation, Osaka, Japan

[21] Appl. No.: 449,857

[22] Filed: Dec. 15, 1982

[30] Foreign Application Priority Data

Jul. 15, 1982 [JP] Japan .................................. 57-123650

[51] Int. Cl.$^3$ .............................................. C08F 10/06
[52] U.S. Cl. ...................................... 526/351; 526/119; 526/142; 525/240
[58] Field of Search .......................................... 526/351

[56] References Cited

U.S. PATENT DOCUMENTS

| | | | |
|---|---|---|---|
| 4,082,716 | 4/1978 | Fielding et al. | 526/351 |
| 4,283,463 | 8/1981 | Shiga et al. | 526/348.1 |
| 4,304,892 | 12/1981 | Shiga et al. | 526/142 |
| 4,309,521 | 1/1982 | Sato et al. | 526/901 |
| 4,368,304 | 1/1983 | Sato et al. | 526/351 |
| 4,387,198 | 6/1983 | Sato et al. | 526/351 |
| 4,405,775 | 9/1983 | Hashimoto | 526/351 |

*Primary Examiner*—Edward J. Smith
*Attorney, Agent, or Firm*—Fred Philpitt

[57] ABSTRACT

A polypropylene resin from which high-rigidity molded products can be produced even when no particular additive is added, is provided, which resin has a melt rate of 0.1 to 100, a density of 0.905 to 0.936, and a boiling n-heptane-insoluble part whose isotactic pentad ratio ($P_0$) is 0.975 to 0.995, and whose pentad ratio ($P_2$) having two different kinds of configurations of 0.002 to 0.000%, and preferably has a melting point of 165° to 170° C. as measured by differential scanning calorimetry.

3 Claims, No Drawings

POLYPROPYLENE RESIN FOR HIGH-RIGIDITY MOLDED PRODUCTS

BACKGROUND OF THE INVENTION

1. Field of the Invention

This invention relates to a polypropylene resin for high-rigidity molded products. More particularly it relates to a polypropylene resin (hereinafter often abbreviated to polypropylene) yielding high-rigidity molded products even without adding any particular additive.

2. Description of the Prior Art

Polypropylene is superior in heat resistance, chemical resistance and electric properties, and also good in rigidity, tensile strength, optical characteristics and processability. Thus it has been broadly used for injection molding, film- or sheet-extrusion molding, blow molding, etc.

However, these properties have been not always satisfactory depending on use applications, and its uses have been restricted.

Particularly the rigidity of polypropylene is lower than those of polystyrene and ABS resin and this has caused a serious bottleneck in broadening its application fields. If its rigidity is improved, it is possible to reduce the thickness of the resulting molded product as much. This is not only effective for resources-saving, but also the cooling velocity at the time of molding is increased; hence it is possible to make the molding velocity per unit time faster and improve the productivity.

The present invention is based on a finding that high-rigidity molded products of polypropylene which have never been obtained can be obtained by using a polypropylene produced by polymerizing propylene so as to develop specified physical properties.

As a known art for improving the rigidity of crystalline polypropylene, for example, there is a process of adding an organic neucleus-creating agent such as aluminum para-t-butylbenzoate, 1,3- or 2,4-dibenzylidenesorbitol, etc. to polypropylene and molding the mixture, but the process has such drawbacks that the cost is high and hence uneconomical, and moreover, the luster, impact strength, tensile elongation, etc. are greatly reduced. As another means for rigidity improvement, there is a process of using various inorganic fillers such as talc, calcium carbonate, mica, barium sulfate, asbestos, calcium silicate, etc., but this process has such drawbacks that the light weight property and transparency specific of polypropylene are not only harmed, but also the impact strength, luster, tensile strength, additive property, etc. are lowered. As a technique of using polypropylene having a higher isotacticity for obtaining high-rigidity molded products (Japanese patent application laid-open No. Sho 55-81125), but polypropylene used therein has an isotacticity in the range of those according to conventional art; hence the effectiveness of improving the rigidity of molded products is still insufficient.

In view of the present status of the abovementioned known art, the present inventors have made strenuous studies for obtaining a polypropylene resin from which high-rigidity molded products can be processed without adding any additive, and as a result have found that when a polypropylene resin which satisfies the requirements of the present invention mentioned below is processed, the objective high-rigidity molded products are obtained.

As apparent from the above description, an object of the present invention is to provide a polypropylene resin from which high-rigidity molded products can be produced. Another object of the present invention is to broaden concrete application fields of polypropylene resins.

SUMMARY OF THE INVENTION

The present invention has the following two aspects:

(1) a polypropylene resin for high-rigidity molded products which comprises having a melt flow rate of 0.1 to 100, a density of 0.905 or higher, and a boiling n-heptane-insoluble part whose isotactic pentad ratio ($P_o$) is 0.975 or higher, and whose pentad ratio ($P_2$) having two different kinds of configurations is 0.002% or lower; and (2) a polypropylene resin according to the above item (1), having a melting point of 165° to 170° C. as measured by differential scanning calorimetry.

DETAILED DESCRIPTION OF THE INVENTION

The present invention and its effectiveness will be described in detail.

The polypropylene resin of the present invention has a density (g/cm$^3$ at 23° C.) of 0.905 or higher. The upper limit is not particularly defined, but densities up to about 0.936 can be practically employed in view of production of crystalline polypropylene. If the density is less than 0.905 as the lower limit, bending modulus of molded products, etc. are insufficient. Further, the melt flow rate (MFR, 230° C., 10 minutes) is in the range of 0.1 to 100. If it is less than 0.1, the fluidity at the time of melting is insufficient, and if it exceeds 100, the strength of molded products is insufficient. The most characteristic physical properties of the polypropylene resin of the present invention consist in that the resin has a boiling n-heptane-insoluble part whose isotactic pentad ratio ($P_o$) is 0.975 or higher and whose pentad ratio ($P_2$) having two different kinds of configurations is 0.002% or lower.

The isotactic pentad ratio referred to herein means an isotactic ratio in terms of pentad units in a polypropylene molecular chain, measured by means of $^{13}$C-NMR (see A. Zambelli, Maromolecules 6 925 (1973)). In other words, the ratio means a ratio of propylene monomer units wherein five propylene monomer units are continuously isotactically linked. The peak-assigning method in the above measurement by means of NMR was carried out based on Macromolecules 8 687 (1975). In addition, the measurement by mans of NMR in Examples described later was carried out by using an apparatus of FT-NMR at 270 MHZ, and by improving the signal detection limit up to an isotactic pentad ratio of 0.001, by an integrating measurement of 27,000 times.

As to pentad, ① an isotactic pentad is expressed by mmmm (00000) or (11111); ② a pentad having one different kind of configuration is expressed by either one of mmmr (00001) or (11110), mmrr (00010) or (11101), or mrrm (00100) or (11011); and ③ a pentad having two different kinds of configurations is expressed by mmrm (00011) or (11100), mrrr (00101) or (11010), mrmr (00110) or (11001), rrmr (01001) or (10110), rrrr (01010) or (10101), or rmmr (01110) or (10001), wherein m represents an isotactic dyad; r represents a syndiotactic dyad; and 0 and 1 each represents an individual monomer unit configuration along the polymer chain, and 0 represents a configuration while 1 represents a reverse configuration. Now, the boiling n-hexane-insoluble part of heretofore known kinds of polypropylene has an isotactic pentad ratio of 0.970 or lower (see e.g. Japanese Patent Publication No. Sho 56-50853/1981, Die Makromolekulare Chemie 176 2766 (1975) or Die Makromol. Chem. 178 1102–1103 (1977)), and as to these kinds of polypropylene, too, signals of a pentad ratio having two diffrent kinds of configurations ($P_2$) have been observed. However, surprisingly enough, the boiling n-heptane-insoluble part of polypropylene of the present invention exhibited a $P_2$ value which had never been recognized even according to a high-sensible $^{13}C$-FT-NMR employed for analyzing products of the present invention, as far as knowledge of the present inventors was concerned. So long as this fact was concerned, the above insoluble part was confirmed to be a new substance. In addition, the insoluble part was measured as follows in Examples mentioned later:

Polypropylene (5.0 g) is completely dissolved in boiling n-xylene (500 ml) and the resulting solution is fed in methanol (5 l) to obtain a precipitate, which is then recovered and dried, followed by extracting the dried material with boiling n-heptane in a Soxhlet extractor for 6 hours to obtain an extraction residue, that is, the above-mentioned insoluble part. Similarly, as to the density, a sample is prepared according to a press method described in JIS K 6758 and its specific gravity is measured according to a water-replacement method described in JIS K 7112, followed by calculating density.

If the isotactic pentad ratio ($P_o$) relative to products of the present invention is lower than 0.975 and/or the pentad ratio ($P_2$) exceeds 0.002, it is impossible to attain the objective high rigidity. Further the ratio ($P_o$) has no particular upper limitation, but it is possible to actually use those having ($P_o$) values up to about 0.995 in the point of restriction in production of polypropylene of the present invention, at the time when the present invention has been made. Similarly the ratio ($P_2$) has no particular lower limit, but it is possible to use those having ($P_2$) values of 0.002 or lower, and 0.001 as a detection limit or lower and hence measurably 0.000, in the aspect of analysis at the present time.

Further the melting point of the polypropylene of the present invention is about 2° to 5° C. higher than those of conventional crystalline polypropylene. Namely products of the present invention are preferably a polypropylene resin having a melting point of 165° to about 170° C. as measured by differential scanning calorimetry. Further it has been clarified that the products of the present invention have a novel structure that their latent heat of fusion is about 10% greater than conventional products and also their crystallinity is extremely high. In addition, it has been confirmed from the facts of (1) a high growth rate of spherulites and (2) a large number of spherulite nucleus generated, that polypropylene of the present invention has a much higher rate of crystallization from its molten state (accompanying its cooling) than those of conventional products. From the above facts, it is presumed that the basis relative to physical properties on which polypropylene of the present invention bears a high rigidity consist in the above-mentioned extremely high crystallinity and much higher rate of crystallization.

When molded products are produced using polypropylene of the present invention, it is possible if necessary to blend a suitable amount of one or more kinds of additives such as heat stabilizer, antioxidant, ultraviolet absorbing agent, antiblocking agent, coloring agent, etc.

Further, it is also possible to blend a nucleus-creating agent as a rigidity-improving agent according to prior art whereby the rigidity is synergistically improved. Also in the case where another rigidity-improving agent such as an inorganic filler e.g. talc is used, similar effectiveness is exhibited; thus it is possible to attain the same extent of rigidity in a smaller amount thereof used, than that in the case where it is blended to conventional polypropylene. Further, also in the case where polymers such as ethylene-propylene rubber (EPR), polyethylene (according to low, medium or high pressure process), ethylene-propylene block copolymer, etc. are blended to polypropylene of the present invention for various purposes such as extending, improvement in high-impact properties, elevation of molding rate, etc., the rigidity-improving effectiveness specific of products of the present invention is retained.

The products of the present invention described above in detail can be produced according to such a process as described later in a reference example. However, the process for producing products of the present invention is, of course, not limited to the process of the reference example, but includes any of processes by which polypropylene conforming with the gist of the present invention is obtained, and which will be published at the filing date of the present application or in future.

The present invention will be further described by way of Examples.

MFR of polypropylene employed in the present invention was measured according to JIS K-6758 (230° C.). Further, as to the melting point according to DSC (differential scanning calorimetry), using Shimazu DT-30 (trade name of apparatus manufactured by Shimazu Seisakusho Co., Japan), a sample (10 mg±0.5 mg) was heated up to 230° C. at a rate of 10° C./min., followed by keeping it at 230° C. for 10 minutes, lowering the temperature down to 50° C. at a rate of 5° C./min., keeping it at 50° C. for 10 minutes, and again raising the temperature at a rate of 10° C./min.; thus the peak value of the resulting fusion curve was made the melting point.

The measurements of various physical properties in Examples and Comparative examples were carried out according to the following methods:

Methods for measuring physical properties of injection molded products:

| | |
|---|---|
| Bending modulus: | JIS K 6758 (kg f/cm$^2$) |
| Bending strength: | JIS K 6758 (kg f/cm$^2$) |
| Tensile strength: | JIS K 6758 (kg f/cm$^2$) |
| Hardness (Rockwell): | JIS K 6758 (R-scale) |
| Heat deformation temperature (HDT): | JIS K 7202 (°C.) |
| I I (23° C.): | JIS K 6758 (kg · cm/cm) |

Methods for measuring physical properties of films:

| | |
|---|---|
| Young's modulus: | ASTM D 888 (kg f/mm$^2$) |
| Tensile yield strength: | ASTM D 882 (kg f/mm$^2$) |
| Haze: | ASTM D 1003 (%) |

Punching impact strength: ASTM D 781 (kg f · cm)

EXAMPLES 1~5 AND COMPARATIVE EXAMPLES 1~3

To polypropylene powder (4 kg) having the values of MFR, density, NMR pentad ratio of boiling n-heptane-insoluble part and DSC analysis, each indicated in Table 1 were added a phenolic heat stabilizer (0.004 kg) and calcium stearate (0.004 kg), followed by mixing them by means of a high-speed agitation type mixer (Henschel mixer (trade name)), at room temperature for 10 minutes and granulating the mixture by means of an extrusion type granulator having a screw bore diameter of 40 mm. The resulting granulated material was molded by means of an injection molding machine, at a fusion temperature of 230° C. and at a die temperature of 50° C. to prepare a test piece of JIS type, which was then conditioned in a room at a humidity of 50%, at room temperature (23° C.) for 2 hours, followed by measuring values of physical properties as in Table 1. The results are shown in Table 1.

As apparent from the Table, when polypropylene in the range of the present invention is used, it is possible to obtain molded products having a notably superior rigidity. In the case of Comparative example 2 where the ($P_o$) value was in the range of the present invention, but the value of density was outside the range of the present invention, improvement in the rigidity was insufficient. In the cases of Comparative examples 1 and 3, conventional kinds of polypropylene were used (K-1800 in Comparative example 1 and K 1011 in Comparative example 3, both, trade name of commercially available grade powder manufactured by Chisso Corporation, Japan), and test pieces prepared therefrom were far inferior to those of the present invention in the rigidity.

EXAMPLE 6 AND COMPARATIVE EXAMPLES 4 AND 6

In Example 6 and Comparative example 4, aluminum para-t-butylbenzoate (12 g) as a nucleus-creating agent was added to polypropylene of Example 1 and that of Comparative example 1, respectively. In this Example, the resulting product had a rigidity similar to or higher than that of a high-impact polystyrene (Styron 472 ®) shown in Comparative example 6; thus a possibility of extending the application fields of polypropylene to those of high-impact polystyrene, ABS, etc. has been found.

EXAMPLE 7 AND COMPARATIVE EXAMPLE 5

Talc (average particle size: 3–4μ) in an amount of 400 g (in Example 7) or 1 Kg (in Comparative example 5) was added to polypropylene of Example 1 and that of Comparative example 1, respectively.

The amount of talc added in Example 7 was as small as 40% of the amount in Comparative example 5, and nevertheless the rigidity value in Example 7 amounted to that to the same extent as in Comparative example 5.

EXAMPLE 8 AND COMPARATIVE EXAMPLE 7

An ethylene-propylene block copolymer having an ethylene content of 12%, an ethylene/propylene composition ratio in the ethylene-propylene random copolymer part, of 55/45 (ratio by weight), and an MFR of 8.2, aluminum para-t-butylbenzoate (16 g) and the additive used in Example 1 and in the same amount as in Example 1, were added to the polymer of Example 1 and that of Comparative example 1, each in an amount of 2 Kg, followed by granulation and evaluation of physical properties as in Example 1.

When polypropylene of the present invention is used, it is possible to improve the high-impact strength of molded products therefrom to a large extent, while maintaining a rigidity higher than those of conventional polypropylene.

TABLE 1

Physical properties of polypropylene and rigidity of molded product (I)

| | Example | | | | | Comparative example | | |
|---|---|---|---|---|---|---|---|---|
| | 1 | 2 | 3 | 4 | 5 | 1 | 2 | 3 |
| MFR | 23 | 29 | 4.5 | 11.2 | 0.51 | 22 | 31 | 0.68 |
| Density | 0.912 | 0.910 | 0.910 | 0.913 | 0.908 | 0.903 | 0.904 | 0.900 |
| Boiling-n-heptane-insoluble part | | | | | | | | |
| ($P_0$) | 0.989 | 0.980 | 0.985 | 0.992 | 0.979 | 0.945 | 0.979 | 0.915 |
| ($P_2$) | <0.002 | same as left | | | | 0.015 | 0.007 | 0.022 |
| DSC, MP (°C.) | 168 | 167 | 167 | 168 | 165 | 163 | 165 | 162 |
| Bending modulus* | 21,900 | 20,800 | 21,200 | 22,500 | 19,400 | 14,200 | 14,900 | 12,600 |
| Bending strength* | 571 | 562 | 565 | 580 | 531 | 413 | 421 | 368 |
| Tensile strength* | 415 | 407 | 412 | 423 | 396 | 345 | 355 | 325 |
| Hardness (R-scale) | 117 | 116 | 116 | 120 | 110 | 104 | 105 | 101 |
| HDT (°C.) | 135 | 131 | 133 | 134 | 128 | 115 | 119 | 103 |
| II (Kgfcm/cm) | 2.8 | 2.8 | 4.1 | 3.6 | 6.8 | 2.8 | 2.7 | 6.9 |

Note:
*(Kgf/cm$^2$)

TABLE 2

Physical properties of polypropylene and rigidity of molded product (II)

| | Example | | | Comparative example | | | |
|---|---|---|---|---|---|---|---|
| | 6 | 7 | 8 | 4 | 5 | 6 | 7 |
| MFR | 20 | 18 | 13 | 20 | 17 | 11 | 11 |
| Density | 0.914 | 0.942 | 0.906 | 0.905 | 0.998 | 1.054 | 0.901 |
| Boiling-n-heptane- | | | | | | | |

TABLE 2-continued

Physical properties of polypropylene and rigidity of molded product (II)

| | Example | | | Comparative example | | | |
|---|---|---|---|---|---|---|---|
| | 6 | 7 | 8 | 4 | 5 | 6 | 7 |
| insoluble part | | | | | | | |
| ($P_0$) | 0.989 | 0.989 | 0.989 | 0.945 | 0.945 | — | 0.945 |
| ($P_2$) | <0.002 | same as left | | 0.015 | 0.015 | — | 0.015 |
| DSC, MP (°C.) | 169 | | | 164 | | | |
| Bending modulus* | 24,700 | 24,900 | 18,500 | 17,100 | 24,500 | 21,100 | 13,200 |
| Bending strength* | 594 | 612 | 514 | 476 | 592 | 380 | 385 |
| Tensile strength* | 430 | 406 | 387 | 372 | 319 | 290 | 341 |
| Hardness (R-scale) | 118 | 120 | 110 | 108 | 107 | 113 | 102 |
| HDT (°C.) | 143 | 145 | 125 | 122 | 136 | 83 | 112 |
| II (23° C.)** | 2.7 | 2.6 | 7.5 | 2.7 | 2.6 | 6.5 | 7.8 |
| Compounding agent (PHR) | | | | | | | |
| Nucleus-creating agent | 0.3 | — | 0.3 | 0.3 | — | — | 0.3 |
| Talc | — | 10 | — | — | 25 | — | — |
| Compounding polymer | | | ② | | | ① | ② |

Note:
*(Kgf/cm²),
**(Kg/cm/cm),
① Styron 472 (trademark)
② Block copolymer

EXAMPLE 9 AND COMPARATIVE EXAMPLE 8

A phenolic heat stabilizer (0.005 Kg), calcium stearate (0.005 Kg) and fine powder of silica (0.01 Kg) were added to various kinds of polypropylene described in the following Table 3, each in an amount of 5 Kg, followed by mixing them by means of a high-speed agitation type mixer (Henschel mixer (trade name)) at room temperature for 10 minutes and granulating the mixture by means of an extrusion type granulator having a screw bore diameter of 40 mm. The resulting granulated material was formed by means of a film-making machine (CYT, trade name of machine manufactured by Yamaguchi Seisakusho Co.) at a die temperature of 215° C. and at a cooling temperature of 20° C. to prepare an inflation film having a spread width of 150 mm and a thickness of 30μ. The film was then allowed to stand and conditioned in a room of constant temperature and constant humidity at room temperature (23° C.) and at a humidity of 50%, followed by measuring the values of physical properties as in Table 3.

It was confirmed that the Young's modulus in Example 9 was much improved as compared with that in Comparative example 8.

EXAMPLE 10 AND COMPARATIVE EXAMPLE 9

A phenolic heat stabilizer (0.005 Kg), calcium stearate (0.005 Kg) and super-fine powder of silica (average particle size: 0.1μ) (0.0025 Kg) were added to various kinds of polypropylene described in Table 3, followed by mixing them by means of a high-speed agitation type mixer at room temperature for 10 minutes and then granulating the mixture by means of an extrusion type granulator having a bore diameter of 40 mm. The resulting granulated material was then extruded by means of a T-die type film-making machine at a resin temperature of 250° C. and quenched by means of a roll cooled to 20° C. to obtain a sheet of 1 mm thick. This sheet was heated by hot air at 150° C. for 70 seconds and stretched by a biaxially stretching machine at the same time in both the longitudinal and lateral directions at a rate of 5 m/sec., each to 7 times to obtain a biaxially stretched film of 20μ thick. The values of physical properties of the film are shown in Table 3.

When the present invention was applied to biaxially stretched films, an effectiveness of notable improvement in Young's modulus was confirmed.

TABLE 3

Physical properties of polypropylene and rigidity of molded product (III)

| | Example 9 | Compar. ex. 8 | Example 10 | Compar. ex. 9 |
|---|---|---|---|---|
| MFR | 8.7 | 8.4 | 1.7 | 1.8 |
| Density | 0.910 | 0.902 | 0.908 | 0.901 |
| Boiling-n-heptane-insoluble part | | | | |
| ($P_0$) | 0.985 | 0.925 | 0.982 | 0.921 |
| ($P_2$) | <0.002 | 0.017 | <0.002 | 0.024 |
| DSC; MP (°C.) | 166 | 163 | 165 | 163 |
| Physical properties of film* | | | | |
| Young's modulus | 99 | 74 | 375 | 195 |
| Haze | 2.0 | 1.9 | 0.9 | 0.6 |
| Punching impact strength** | 5.4 | 5.6 | 10 | 9 |
| Tensile yield strength** | 2.8 | 2.1 | — | — |
| Stretchability | — | — | good | good |

Note:
*Example 9 and Comparative example 8 . . . IPP (uniaxially stretched product);
Example 10 and Comparative example 9 . . . OPP (biaxially stretched product)
**(Kgf/cm²)

PRODUCTION EXAMPLE

A process for producing polypropylene employed in Example 1 among those of the present invention will be described below.

(1) Preparation of Catalyst n-Hexane (600 ml), diethylaluminum monochloride (DEAC) (0.50 mol) and diisoamyl ether (1.20 mol) were mixed at 25° C. for one minute and reacted at the same temperature for 5 minutes to obtain a reaction liquid (VI) (molar ratio of diisoamyl ether/DEAC: 2.4). TiCl₄ (4.0 mols) was placed in a nitrogen gas-purged reactor, follwed by heating it to 35° C., dropwise adding the total amount of the above reaction liquid (VI) over 180 minutes, keeping the mixture at the same temperature for 30 minutes, raising the temperature up to 75° C., further reacting for one hour, cooling down to room temperature, removing the supernatant, and 4 times repeating a procedure of adding n-hexane (4,000 ml) and removing the supernatant by decantation to obtain a solid product (II) (190 g). The total amount of this product (II) was suspended in n-hexane (3,000 ml) to prepare a suspension, and diisoamyl ether (160 g) and TiCl$_4$ (350 g) were added to the suspension at room temperature (20° C.) over about one minute, followed by reacting them for one hour, cooling down to room temperature (20° C.), removing the supernatant by decantation, five times repeating a procedure of adding n-hexane (4,000 ml), stirring for 10 minutes, still standing and removing the supernatant, and drying under reduced pressure, to obtain a solid product (III).

(2) Preparation of Preactivated Catalyst

Into a 20 l capacity stainless steel reactor equipped with slant blades, after purged with nitrogen gas, were added n-hexane (15 l), diethylaluminum monochloride (42 g) and the solid product (III) (30 g) at room temperature, followed by introducing hydrogen (15 Nl), reacting them under a propylene partial pressure of 5 Kg/cm$^2$G for 5 minutes, and removing unreacted propylene, hydrogen and n-hexane under reduced pressure, to obtain a preactivated catalyst (VII) in the form of powder (reacted propylene per g of solid product (III): 82.0 g).

(3) Propylene Polymerization

Into a 250 l capacity stainless steel polymerization vessel equipped with turbine type agitating blades, after purged with nitrogen gas, were fed n-hexane (100 l) and then diethylaluminum monochloride (10 g), the preactivated catalyst (VII) (10 g) and methyl p-toluylate (15.0 g), followed by adding hydrogen (350 Nl), raising the temperature up to 70° C., feeding propylene, and raising the total pressure up to 10 Kg/cm$^2$G, continuing polymerization for 4 hours at 70° C. and under 10 Kg/cm$^2$G, feeding methanol (25 l), raising the temperature up to 80° C., after 30 minutes further adding a 20% aqueous solution of NaOH (100 g), stirring for 20 minutes, adding purified water (50 l), discharging remaining propylene, withdrawing the aqueous layer, further adding purified water (50 l), washing with water with stirring for 10 minutes, discharging the aqueous layer, further withdrawing a polypropylene-n-hexane slurry, filtering and drying, to obtain polypropylene powder.

What is claimed is:
1. A polypropylene resin
  (1) useful for high-rigidity molded products,
  (2) having a melt flow rate of 0.1 to 100,
  (3) having a density of 0.905 to 0.936 g/cm$^3$
  (4) having a boiling n-heptane insoluble part
    (a) whose isotactic pentad ratio ($P_o$) is within the range of 0.975 to 0.995, and
    (b) having a pentad ratio ($P_2$) having two different kinds of configurations is less than 0.002%, and
  (5) having a melting point of 165° to 170° as measured by differential scanning calorimetry.
2. High rigidity molded products made from the polypropylene resin of claim 1.
3. High rigidity molded products made from the polypropylene resin of claim 1 wherein the bending modulus is 18,500–24,900 Kgf/cm$^2$.

* * * * *